(12) United States Patent
Sato

(10) Patent No.: US 7,066,817 B2
(45) Date of Patent: Jun. 27, 2006

(54) VIDEO GAME WITH A SPECIFIC POINT OF VIEW SELECTION DEVICE BASED ON A PARAMETER

(75) Inventor: Yasuhiro Sato, Saitama (JP)

(73) Assignee: Kabushiki Kaisha Square Enix, Tokyo (JP)

(*) Notice: Subject to any disclaimer, the term of this patent is extended or adjusted under 35 U.S.C. 154(b) by 676 days.

(21) Appl. No.: 09/969,773

(22) Filed: Oct. 4, 2001

(65) Prior Publication Data

US 2003/0027637 A1    Feb. 6, 2003

(30) Foreign Application Priority Data

Jul. 13, 2001    (JP)    ............................. 2001-214400

(51) Int. Cl.
*A63F 13/00*    (2006.01)

(52) U.S. Cl. .............................. 463/30; 463/33; 463/7; 463/8

(58) Field of Classification Search .................... 463/1, 463/35, 43, 38, 44, 6–8, 30–33; 273/459, 273/460; 345/629
See application file for complete search history.

(56) References Cited

U.S. PATENT DOCUMENTS

| | | | | |
|---|---|---|---|---|
| 4,491,324 A | * | 1/1985 | Yoshida | 463/8 |
| 5,649,862 A | * | 7/1997 | Sakaguchi et al. | 463/44 |
| 5,880,709 A | * | 3/1999 | Itai et al. | 345/629 |
| 6,093,105 A | * | 7/2000 | Morihira | 463/38 |
| 6,110,215 A | * | 8/2000 | Stone | 703/6 |
| 6,165,073 A | | 12/2000 | Miyamoto et al. | |
| 6,210,273 B1 | * | 4/2001 | Matsuno | 463/8 |
| 6,347,993 B1 | * | 2/2002 | Kondo et al. | 463/1 |
| 6,409,604 B1 | * | 6/2002 | Matsuno | 463/43 |
| 6,491,582 B1 | * | 12/2002 | Toyohara et al. | 463/1 |
| 6,553,663 B1 | * | 4/2003 | Bunch et al. | 29/857 |
| 6,623,358 B1 | * | 9/2003 | Harima | 463/31 |
| 2001/0029203 A1 | * | 10/2001 | Shoji et al. | 463/33 |

FOREIGN PATENT DOCUMENTS

| | | |
|---|---|---|
| JP | 10211359 | 8/1998 |
| JP | 11-110926 | * 12/1999 |
| JP | 20 00107467 | 4/2000 |
| JP | 20 00132705 | 5/2000 |

OTHER PUBLICATIONS

English Language Abstract of JP Appln. No. 2000-107467, and an English Language Translation of paragraphs [0007] & [0010].
English Language Abstract of JP Appln. No. 10-211359, and an English Language Translation of paragraphs [0070] & [0072].
English Language Abstract of JP Appln. No. 2000-132705.

* cited by examiner

*Primary Examiner*—John M. Hotaling, II
(74) *Attorney, Agent, or Firm*—Greenblum & Bernstein, P.L.C.

(57) ABSTRACT

Game scenes are flexibly switched to different points of view selected according to character status and game progress, thereby preventing a loss of interest in the game. A specified hit count HPX and threshold value T1 are compared, and if HPX>T1, control data is generated to display image X1 from a particular perspective. If (HPX>T1) is not true, HPX is compared with threshold value T2 (T1>T2>0). If HPX>T2, control data is generated to display image X2 from a particular perspective. If (HPX>T2) is not true, the maximum decrease D possible in the next attack is subtracted from HPX to calculate inferred value HP', which is then compared with 0. If (HP'<=0) is not true, control data is generated to display image X3 from a particular perspective, but if HP'<=0, control data is generated to display image X4 from a particular perspective.

24 Claims, 5 Drawing Sheets

| | CHARACTER (X = A) | CHARACTER (X = B) |
|---|---|---|
| IMAGE DATA FOR BATTLES IN PROGRESS | A1 | B1 |
| | A2 | B2 |
| | A3 | B3 |
| | A4 | B4 |
| IMAGE DATA FOR END OF BATTLE | A5 | B5 |
| | A6 | B6 |
| | A7 | B7 |

VIDEO GAME WITH A SPECIFIC POINT OF VIEW SELECTION DEVICE BASED ON A PARAMETER

CROSS-REFERENCE TO RELATED APPLICATION

The present disclosure relates to subject matter contained in Japanese Patent Application No. 2001-214400, filed on Jul. 13, 2001, the disclosure of which is expressly incorporated herein by reference in its entirety.

BACKGROUND OF THE INVENTION

1. Field of the Invention

The present invention relates to a video game program for displaying multiple characters, including a player character and enemy character, on screen and controlling battles between the characters, a computer-readable data storage medium storing the video game program, a video game processing method, and a video game processing apparatus.

2. Description of Related Art

Role playing games are one genre of video game played using a computer. In a typical role playing game, the player takes the role of a particular character in the game and experiences simulated adventures through the character that the player controls (referred to below as the "player character") as the story unfolds. In many such games, the player character and opposing character (referred to below as the "enemy character") are placed in set zones created in a virtual space. As the player character advances into a zone, the player character fights with an enemy character trying to thwart the player character's attempts to achieve the goal of the story, and the story advances when the player character defeats the enemy character.

The player character is typically controlled using buttons on a keypad or a joystick. The player character moves and performs specific actions in response to keypad operations. Numerous battle scenes and other events are distributed throughout the story. The game advances as a result of selected operations performed at each event.

A drawback to such conventional video games is that battle scenes are often presented from the same fixed perspective. The scenes thus lack realism, display content becomes boring, and interest is gradually lost the more the game is played.

There is therefore a need for video games that can flexibly switch to images from a particular perspective determined according to the character status and game progress.

SUMMARY OF THE INVENTION

With consideration for the above needs, an object of the present invention is to provide a video game program that can flexibly switch to an image from a particular perspective according to the character status and the current state of game play, and can thereby prevent a drop in interest. A further object is to provide a computer-readable data storage medium recording this video game program, a video game processing method, and a video game processing apparatus.

To resolve the above problems and achieve the above object, a first aspect of the present invention is a computer-readable data recording medium for storing a video game program for displaying a plurality of characters, including a player character and enemy character, on screen and controlling a battle between the characters. The program causes a computer to execute: a first step comparing a parameter determining an action capability of a character participating in the battle with a specific threshold value; and a step for changing to an image from a specific perspective selected from among a plurality of perspective images according to a result of the comparison in the first step.

It is therefore possible with this first aspect of the invention to provide a recording medium that can prevent a loss of interest because the displayed image is continually updated to an image from a different perspective according to the character status.

Preferably, N (where N is a natural number) mutually different numeric values other than the maximum and minimum values of the parameter determining character capabilities are usable as the specific threshold value. One of these numeric values is set to be close to the minimum parameter value, and the perspective is changed in (N+1) stages.

By thus changing the display to present images from multiple different perspectives until the battle is decided, and then displaying another specific image just before the battle is decided, a recording medium that improves realism and prevents a drop in interest can be provided.

Yet further preferably, the stored program additionally executes a second step for comparing a parameter determining an action capability of the player character and a parameter determining an action capability of the enemy character. In this case the perspective-changing step changes to an image from a specific perspective selected from among a plurality of perspective images by also considering the result of this second comparison step.

By thus changing the screen to a particular perspective according to the character, a recording medium that prevents a drop in interest can be provided.

Yet further preferably, the stored program additionally executes a step inferring that the parameter determining action capability will be less than or equal to a minimum value as a result of a next attack. In this case the perspective-changing step changes to an image from a specific perspective selected from among a plurality of perspective images according to also the result of this inferring step.

A specific image is therefore reliably displayed immediately before the battle is decided. It is therefore possible to provide a recording medium that improves realism and prevents a drop in interest.

Yet further preferably, the stored program additionally executes a step evaluating game progress. In this case the perspective-changing step changes to an image from a specific perspective selected from among a plurality of perspective images according to also the result of this evaluation step.

In this case the image is continually changed to a particular perspective determined according to the progress of the game (battle). It is therefore possible to provide a recording medium that prevents a drop in interest.

Yet further preferably, the stored program additionally executes a step determining whether to enable a specific dialogue according to the result of the first step.

In this case it is possible to provide a recording medium that further increases realism and prevents a loss of interest because the characters speak a specific dialogue appropriate to game progress in conjunction with image changes.

A second aspect of the present invention is a video game program for displaying a plurality of characters, including a player character and enemy character, on screen and controlling a battle between the characters. The program causes a computer to execute: a first step comparing a parameter determining an action capability of a character participating in the battle with a specific threshold value; and a step for changing to an image from a specific perspective selected from among a plurality of perspective images according to a result of the comparison in the first step.

This second aspect of the invention can prevent a drop in interest because the displayed image is continually updated to an image from a different perspective according to the character status.

Preferably, N (where N is a natural number) mutually different numeric values other than the maximum and minimum values of the parameter determining character capabilities are usable as the specific threshold value. One of these numeric values is set to be close to the minimum parameter value, and the perspective is changed in (N+1) stages.

By thus changing the display to present images from multiple different perspectives until the battle is decided, and then displaying another specific image just before the battle is decided, realism is improved and a drop in interest can be prevented.

Yet further preferably, the program additionally executes a second step for comparing a parameter determining an action capability of the player character and a parameter determining an action capability of the enemy character. In this case the perspective-changing step changes to an image from a specific perspective selected from among a plurality of perspective images by also considering the result of this second comparison step.

By thus changing the screen to a particular perspective according to the character, a drop in interest can be prevented.

Yet further preferably, the program additionally executes a step inferring that the parameter determining action capability will be less than or equal to a minimum value as a result of a next attack. In this case the perspective-changing step changes to an image from a specific perspective selected from among a plurality of perspective images according to also the result of this inferring step.

A specific image is therefore reliably displayed immediately before the battle is decided. It is therefore possible to improve realism and prevent a drop in interest.

Yet further preferably, the program additionally executes a step evaluating game progress. In this case the perspective-changing step changes to an image from a specific perspective selected from among a plurality of perspective images according to also the result of this evaluation step.

In this case the image is continually changed to a particular perspective determined according to the progress of the game (battle). It is therefore possible to prevent a drop in interest.

Yet further preferably, the program additionally executes a step determining whether to enable a specific dialogue according to the result of the first step.

In this case it is possible to further increase realism and prevent a loss of interest because the characters speak a specific dialogue appropriate to game progress in conjunction with image changes.

A third aspect of the present invention is a video game processing method for a video game for displaying a plurality of characters, including a player character and enemy character, on screen and controlling a battle between the characters. The video game processing method comprises: a first step comparing a parameter determining an action capability of a character participating in the battle with a specific threshold value; and a step for changing to an image from a specific perspective selected from among a plurality of perspective images according to a result of the comparison in the first step.

This third aspect of the invention can prevent a drop in interest because the displayed image is continually updated to an image from a different perspective according to the character status.

Preferably, N (where N is a natural number) mutually different numeric values other than the maximum and minimum values of the parameter determining character capabilities are usable as the specific threshold value. One of these numeric values is set to be close to the minimum parameter value, and the perspective is changed in (N+1) stages.

By thus changing the display to present images from multiple different perspectives until the battle is decided, and then displaying another specific image just before the battle is decided, realism is improved and a drop in interest can be prevented.

Yet further preferably, this video game processing method also has a second step for comparing a parameter determining an action capability of the player character and a parameter determining an action capability of the enemy character. In this case the perspective-changing step changes to an image from a specific perspective selected from among a plurality of perspective images by also considering the result of this second comparison step.

By thus changing the screen to a particular perspective according to the character, a drop in interest can be prevented.

Yet further preferably, this video game processing method also has a step inferring that the parameter determining action capability will be less than or equal to a minimum value as a result of a next attack. In this case the perspective-changing step changes to an image from a specific perspective selected from among a plurality of perspective images according to also the result of this inferring step.

A specific image is therefore reliably displayed immediately before the battle is decided. It is therefore possible to improve realism and prevent a drop in interest.

Yet further preferably, this video game processing method also has a step evaluating game progress. In this case the perspective-changing step changes to an image from a specific perspective selected from among a plurality of perspective images according to also the result of this evaluation step.

In this case the image is continually changed to a particular perspective determined according to the progress of the game (battle). It is therefore possible to prevent a drop in interest.

Yet further preferably, this video game processing method also has a step determining whether to enable a specific dialogue according to the result of the first step.

In this case it is possible to further increase realism and prevent a loss of interest because the characters speak a specific dialogue appropriate to game progress in conjunction with image changes.

A fourth aspect of the present invention is a video game system having a storage means for storing a video game program for displaying a plurality of characters, including a player character and enemy character, on screen and controlling a battle between the characters; a computer for running a program read from the storage means; and an image display used as an output means of the computer. By running the program, the computer compares a parameter determining an action capability of a character participating in the battle with a specific threshold value, and changes to an image from a specific perspective selected from among a plurality of perspective images according to the result of this first comparison.

This fourth aspect of the invention prevents a drop in interest in the game because the displayed image is continually updated to an image from a different perspective according to the character status.

Preferably, N (where N is a natural number) mutually different numeric values other than the maximum and minimum values of the parameter determining character capabilities are usable as the specific threshold value. One of these numeric values is set to be close to the minimum parameter value, and the perspective is changed in (N+1) stages.

By changing the display to present images from multiple different perspectives until the battle is decided, and then displaying another specific image just before the battle is decided, realism is improved and a drop in interest can be prevented.

Yet further preferably, this video game system further compares a parameter determining an action capability of the player character and a parameter determining an action capability of the enemy character, and changes to an image from a specific perspective selected from among a plurality of perspective images according to also the result of this second comparison.

By changing the screen to a particular perspective according to the character, a drop in interest can be prevented.

Yet further preferably, this video game system further infers that the parameter determining action capability will be less than or equal to a minimum value as a result of a next attack, and changes to an image from a specific perspective selected from among a plurality of perspective images according to also the result of this inference.

A specific image is therefore reliably displayed immediately before the battle is decided. It is therefore possible to improve realism and prevent a drop in interest.

Yet further preferably, this video game system further evaluates game progress, and changes to an image from a specific perspective selected from among a plurality of perspective images according to also the result of this evaluation.

In this case the image is continually changed to a particular perspective determined according to the progress of the game (battle). It is therefore possible to prevent a drop in interest.

Yet further preferably, this video game system further determines whether to enable a specific dialogue according to the result of the first comparison.

In this case it is possible to further increase realism and prevent a loss of interest because the characters speak a specific dialogue appropriate to game progress in conjunction with image changes.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Figure 1:
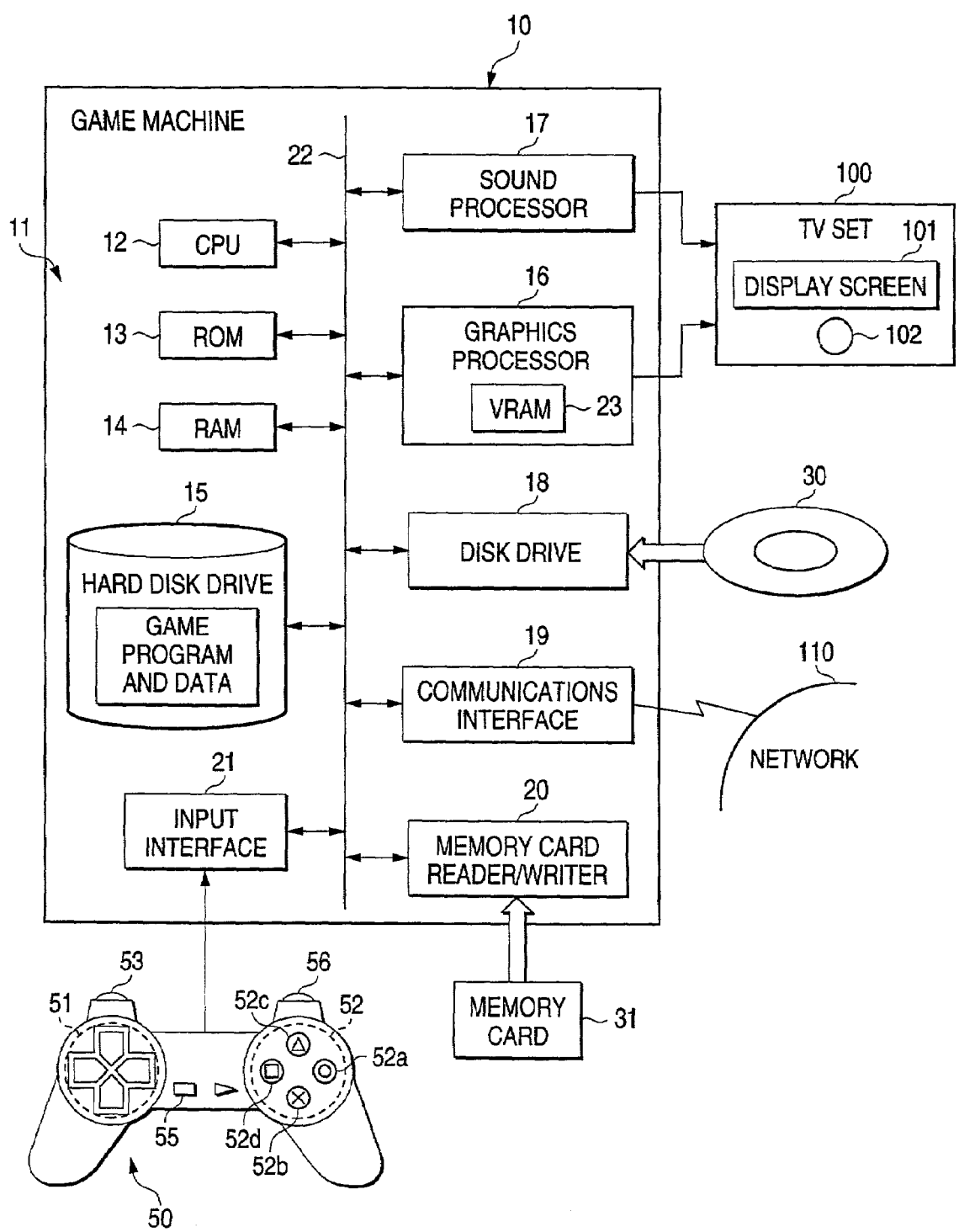
FIG. 1 is a block diagram showing the overall configuration of a video game machine according to a first embodiment of the invention.

A preferred embodiment of the present invention as used in a home video game machine is described below with reference to the accompanying figures. FIG. 1 is a block diagram showing the overall configuration of a video game machine according to this preferred embodiment.

A video game machine in this first embodiment of the invention is described first. Referring to FIG. 1, the video game machine 10 has a game console 11 and a keypad 50 connected to an input jack on the game console 11. A TV set 100 with speakers and a CRT (Cathod Ray Tube) typically is connected to an output jack of the game console 11.

The game console 11 has a CPU (Central Processing Unit) 12, ROM (Read Only Merory) 13, RAM (Random Access Memory) 14, hard disk drive 15, graphics processor 16, sound processor 17, disk drive 18, communications interface 19, memory card reader/writer 20, input interface 21, and a bus 22 interconnecting the various components. The game console 11 is connected through the input interface 21 to the keypad 50, which is the game control unit used by the player.

The keypad 50 has a cross-shaped control cursor 51 and a button group 52. The button group 52 includes an 0 button 52a, an X button 52b, a △ button 52c, and a □ button 52d. A select button 55 is provided on the part between the base of the control cursor 51 and the base of the button group 52. A group of buttons including R1 button 56 and L1 button 53 is also provided on a side of the keypad 50.

The keypad 50 further has switches linked to the control cursor 51, 0 button 52a, X button 52b, △ button 52c, □ button 52d, select button 55, R1 button 56, and L1 button 53. These switches turn on when the corresponding button is pressed. The keypad 50 generates detection signals corresponding to the on/off state of each switch.

The detection signals generated by the keypad 50 are passed to the input interface 21 of the game console 11. When a detection signal from the keypad 50 passes the input interface 21, it becomes detection information indicating whether a particular button on the keypad 50 is on. Control commands input by the user from the keypad 50 are thus supplied to the game console 11.

The CPU 12 centrally controls the video game machine by running an operating system stored to ROM 13, and runs the video game program stored to the program area of RAM 14. The CPU 12 also monitors the operation of the keypad 50 through the input interface 21, runs the video game program stored to the program area of the RAM 14 as necessary, and stores data generated as the game progresses to a specific area in RAM 14 as needed. The ROM 13 includes an EEPROM (Electrically Erasable and Programmable Read Only Memory). Specific data in the RAM 14 that should be stored even when the power is turned off is stored to the EEPROM before the power is turned off.

RAM 14 has a primarily program area, an image data area, a sound data area, and an area for storing other data. Program data, image data, sound data, and other data read from a disk 30, such as, for example, a DVD or CD-ROM disk, by the disk drive 18 is stored to the respective areas by the disk drive 18.

RAM 14 is also used as a work area, and data produced by the progress of the game is stored to the area for storing other data. It should be noted that the program data, image data, audio data, and other data read from disk 30 could be stored to, for example, the hard disk drive 15, with the program data, image data, audio data, and other data stored to the hard disk drive 15 being transferred as needed to the RAM 14. Data produced by the progress of the game and buffered to RAM 14 could likewise be transferred to and stored on hard disk drive 15.

The graphics processor 16 has a frame buffer in VRAM 23 as a buffer memory for storing image data. The graphics processor 16 generates a video signal based on the image data stored to the frame buffer according to control data from the CPU 12 in conjunction with the program execution, and outputs the video signal to the TV set 100. The image data stored in the frame buffer is thus presented on the display screen 101 of the TV set 100.

The sound processor 17 functions to generate sounds, such as, for example, background music, conversations between the characters, sound effects, and other audio signals. Based on data stored to RAM 14, the sound processor 17 outputs sound signals including voice and audio signals to the speaker 102 of the TV set 100 according to control data from the CPU 12 in conjunction with program execution.

The TV set 100 has a display screen 101 and speaker 102 for presenting video (images) and sound, respectively, according to the video game content based on the video and sound signals from the game console 11.

The disk drive 18 enables a disk recording medium 30 such as, for example, a DVD or CD-ROM disk, to be loaded and unloaded as desired, and reads the program data, image data, audio data, and other data of the video game program stored to the disk 30.

The communications interface 19 is connected to a network 110, enabling communication with the data storage devices and data processors of a server in a different location. It should be noted that the program data, image data, audio data, and other data of the video game program read from disk 30 and stored to RAM 14 can be obtained via the network 110 and communications interface 19.

A memory card 31 can be freely loaded and unloaded from the memory card reader/writer 20, and is used to write relatively small amounts of data that should be saved to the memory card 31. This data includes video game settings and data enabling a game to be resumed when a game is not played to the end.

A data storage medium according to a first embodiment of the invention, that is, disk 30, records a video game program for displaying multiple characters, including a player character and enemy character, on screen and controlling battles between the characters. The video game program can be read by a computer (CPU 12 and peripheral devices). The computer executes a first step comparing parameters determining the action capabilities of the characters participating in the battle with specific threshold values, and then executes a perspective-changing step for changing the image to an image providing a specific point of view according to the result of the comparison in the first step. The image is selected from among multiple images providing different perspectives of the battle.

The computer also compares a parameter determining the action capabilities of the player character and a parameter determining the action capabilities of the enemy character so that the step of changing the perspective to an image providing a specific point of view, selected from among multiple views, can be chosen and presented after additionally considering the result of this second comparison step.

The computer can yet further execute a step inferring that the parameter determining character capabilities will be below a bottom limit as a result of a next attack. In this case the step changing the perspective to an image providing a specific point of view selected from among multiple views can be chosen and presented after additionally considering the result of this inference.

Yet further, the computer can execute a step for determining the progress of the game. In this case the step changing the perspective to an image providing a specific point of view selected from among multiple views can be chosen and presented after additionally considering game progress.

Yet further, the computer can also execute a step for determining whether to enable a specific dialogue according to the result of the first comparison step.

Therefore, in addition to the functions needed to achieve a conventional video game through a software process run by a CPU 12 based on data stored to various memory units, a game console 11 according to the present invention has a first comparison function for comparing parameters determining the capabilities of the characters participating in the battle with specific threshold values, and a perspective-changing function for changing the displayed image to an image providing a specific point of view according to the result passed from the first comparison function. The image is selected from among multiple images providing different perspectives of the battle.

The game machine 11 also preferably has a second comparison function for comparing a parameter determining the capabilities of the player character and a parameter determining the capabilities of the enemy character, a function for inferring that the parameter determining character capabilities will be below a bottom limit as a result of a next attack, and a function for determining the progress of the game.

Yet further preferably, the game machine 11 also has a function for enabling a specific dialogue according to the result from the first comparison function.

It is therefore possible to provide a video game that can flexibly switch the game scene to an image providing a specific different point of view selected according to the character status and game progress, thereby preventing a loss of interest in the game. It will also be noted that these functions can be achieved through applying specific hardware rather than as software processes.

Figure 2:
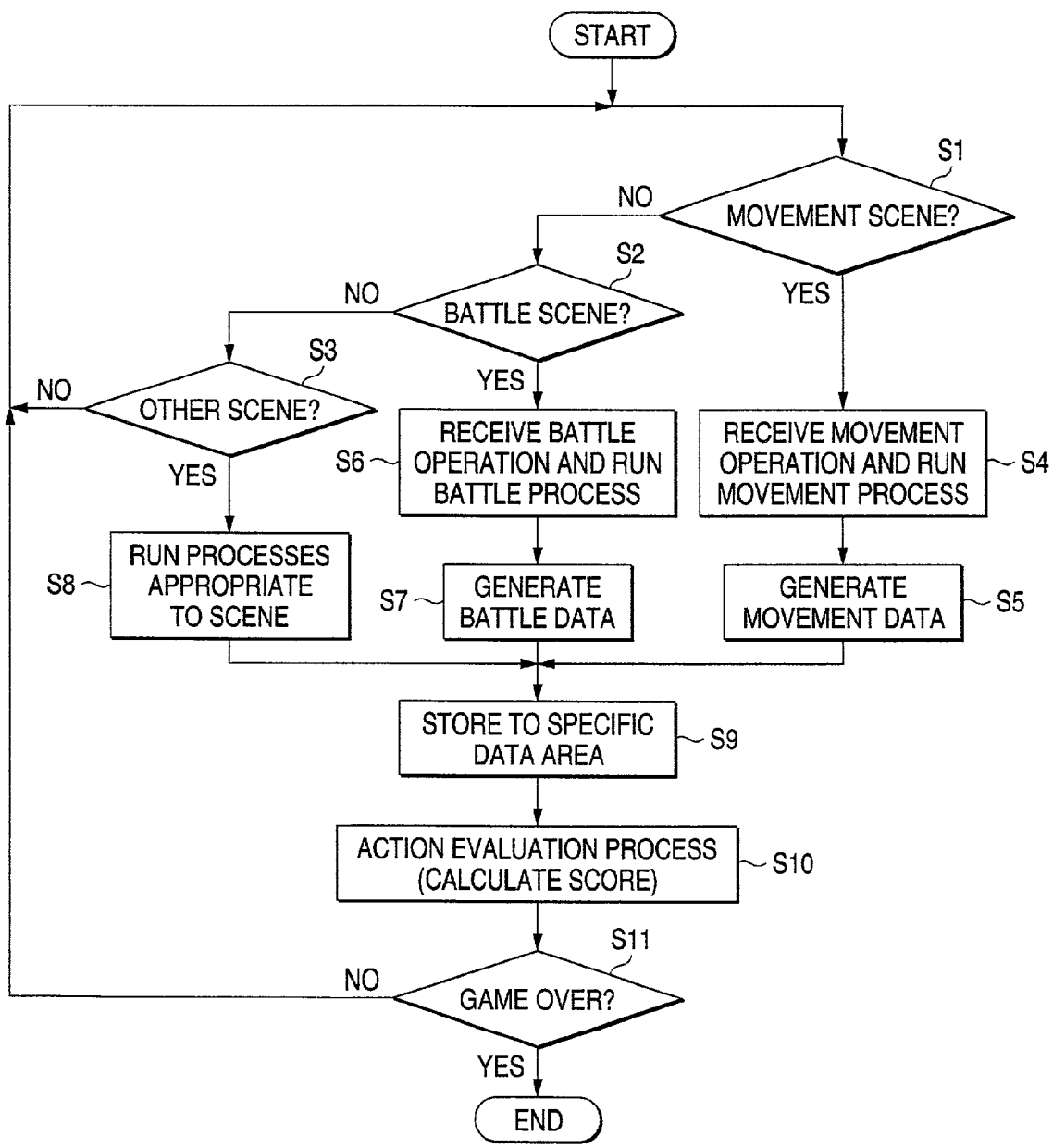
FIG. 2 is a flow chart used to describe the overall operation of a video game machine according to a first embodiment of the invention.

The operation of the first embodiment of the present invention configured as described above is described below. FIG. 2 is a flow chart of an exemplary overall process achieving the operation described above. Reference numerals S1 to S11 in FIG. 2 indicate the steps in this process.

Although not shown in FIG. 2, when the power is turned on, a startup program is first read and run to initialize the system and run the processes needed to start the game. More specifically, the program data, image data, audio data, and other data stored to disk 30 (DVD or CD-ROM, for example) is read by the disk drive 18 and stored to RAM 14.

As may be necessary, data stored to a writable nonvolatile memory such as the ROM 13 EEPROM, hard disk drive 15, or memory card 31 is also read and stored to RAM 14. Game play then advances to a movement scene, battle scene or other scene, and the game program advances to step S1.

Step S1 determines whether the scene is a movement scene. If not (step S1 returns no)), the procedure advances to step S2 to determine if a battle scene was selected. If not (step S2 returns no), the procedure advances to step S3 to determine if another scene (such as dialogue, shopping, or picking something up) was entered. If not (step S3 returns no), the procedure loops back to S1 and steps S1 to S3 repeat in a standby state.

If step S1 detects a movement scene, the procedure advances to step S4 and character movement commands are accepted. A movement process corresponding to the movement command is then executed. When the movement process ends, the procedure advances to step S5 and movement information is generated based on player character location information, which is derived from the movement process. This movement information includes information indicating a zone setting in the virtual space in which the player character is currently located. The procedure advances to step S9 after the movement information is generated.

If step S2 detects a battle scene, the procedure advances to step S6 and battle commands are accepted. A battle process corresponding to the battle command is then executed. When the battle process ends, the procedure advances to step S7 and battle information is generated. The battle information includes the name of the opposing enemy character, how the battle proceeded and the outcome of the battle, and a numeric parameter determining the act capabilities of the player character. Note that this parameter determines the act capabilities of the player character and is referred to below as the "hit count." The procedure advances to step S9 after the battle information is generated.

If step S3 detects another scene (such as dialogue, shopping, or picking something up), the procedure advances to step S8, a process corresponding to that scene is executed, information derived from that process is generated, and the procedure advances to step S9.

The current location of the player character is continuously updated by storing the movement information to a specific area in the RAM 14 in step S9. The battle information and other information is also stored for each zone setting to a specific area in RAM 14. As a result, a history of player character movement is stored by zone setting in memory.

An action evaluation process based on the player character movement history buffered to RAM 14 is executed in step S10. More specifically, information that must be expressed numerically is converted using predefined conversion tables, information that must be weighted is multiplied by a specific coefficient, and the values are totalled to obtain a score. This score is added to the previous score stored at a specific address in RAM 14, and the sum is stored to the specific memory address so that the score is continually updated for use as evaluation data.

When the action evaluation process ends, the procedure advances to step S11. Whether the game is over is determined in step S11. If the game is not over, the procedure loops back to step S1 and steps S1 to S10 repeat.

Although not shown in FIG. 2, if the game is determined to have ended in step S11, the player character movement history, evaluation data, and player character capability settings stored to a specific address in RAM 14 are read from RAM 14 and stored with other data to writable nonvolatile memory such as the ROM 13 EEPROM, hard disk drive 15, or memory card 31. After other processes associated with ending the game are executed, the power supply is turned off and the game ends. By saving data to a nonvolatile memory before the power supply is turned off, the saved data can be read from the memory when the power is turned on the next time and restored to the same areas in RAM 14 where the data was stored before the power turned off.

Figure 3:
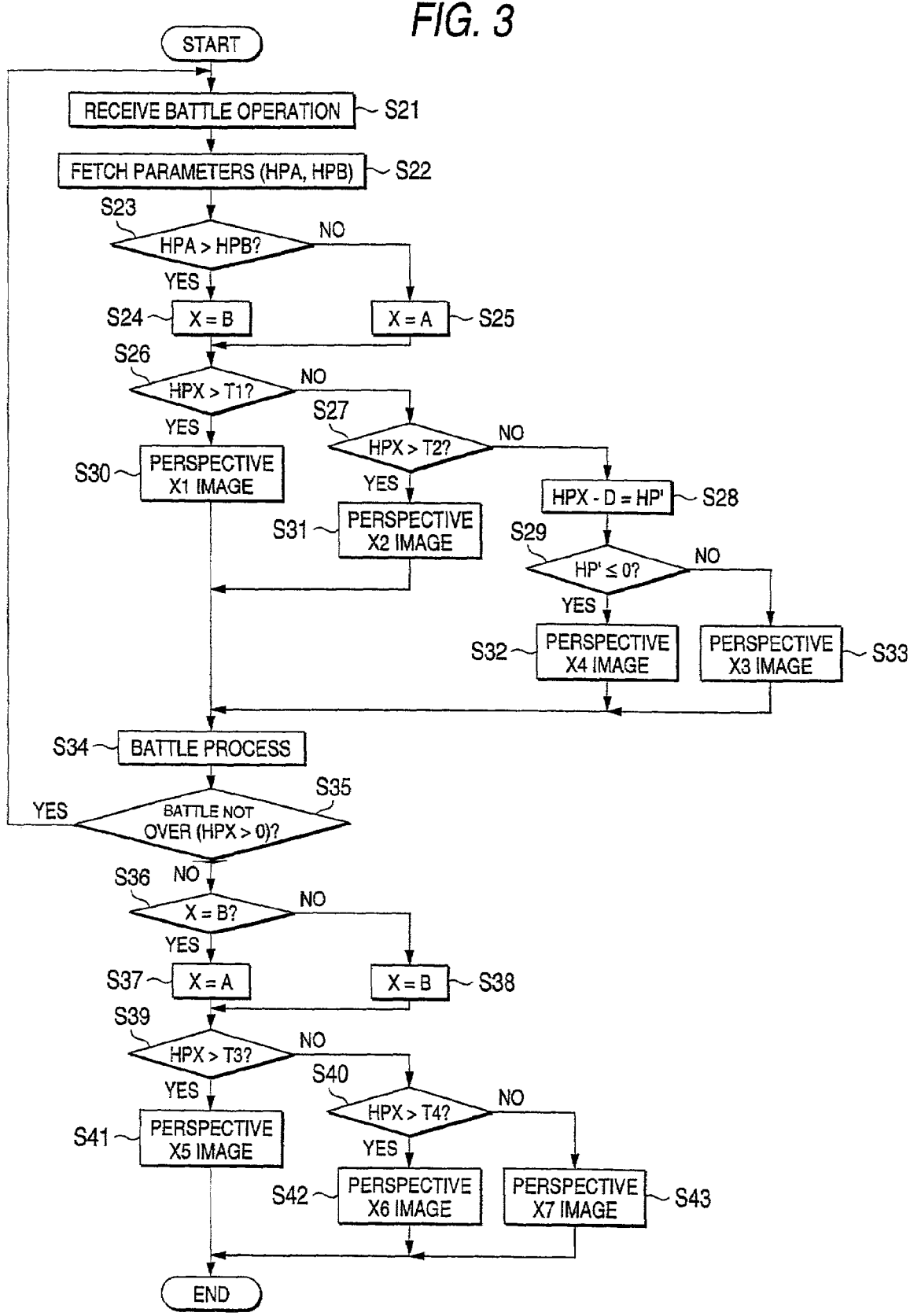
FIG. 3 is a flow chart used to describe the process for accepting battle commands and processing a battle progress in a first embodiment of the present invention.

FIG. 3 is a flow chart of the process for controlling an image selection in the process accepting battle commands and processing the battle scene (step S6 in FIG. 2). FIGS. 4A, 4B, 4C, 4D show some images associated with this image control process.

The process for accepting battle commands and processing the battle scene is described below with reference to FIG. 3 and FIGS. 4(A) to 4(D). Reference numerals S21 to S43 in FIG. 3 indicate the steps in this process. Shown in FIGS. 4A, 4B, 4C, 4D are the player character 401 participating in the battle and the opposing enemy character 402.

When the process for accepting battle commands and processing the battle scene starts (step S6 in FIG. 2), a screen enabling the player to select a specific character action (input a command) is presented and the processor waits for command input (step S21). When the player makes a selection and the action is determined, the procedure advances to step S22.

The player character hit count HPA and enemy character hit count HPB are then obtained (step S22) and compared (step S23). If step S23 determines that HPA>HPB, the procedure advances to step S24, the image control parameter X is set (X=B) and the process variable HPX is set to (HPX=HPB). If step S23 detects that (HPA>HPB) is not true, the procedure advances to step S25, the image control parameter X is set to (X=A), and the process variable HPX is set to (HPX=HPA).

Once the process variable HPX is set, the procedure advances to step S26 and HPX is compared with a specific threshold value T1. If (HPX>T1), the procedure advances to step S30 and the CPU 12 generates information for displaying image X1 from a specific perspective. The procedure then advances to step S34 from step S30.

If in step S26 (HPX>T1) is not true, the procedure advances to step S27 and HPX is compared with a specific threshold value T2 (where T1>T2>). If (HPX>T2), the procedure advances to step S31 and the CPU 12 generates information for displaying image X2 from a specific perspective. The procedure then advances to step S34 from S31.

If in step S27 (HPX>T2) is not true, the procedure advances to step S28. HPX is then decreased by the maximum decrement D possible in the next attack, and HP' (=HPX−D) is calculated as the inferred value for the next attack. Then, in step S29 HP' is compared with the condition for ending the battle, that is, 0. If (HP'≦0) is not true, the procedure advances to step S33 and the CPU 12 generates information for displaying image X3 from a specific perspective. The procedure then advances to step S34 from S33. If in step S29 (HP'≦0), the procedure advances to step S32 and the CPU 12 generates information for displaying image X4 from a specific perspective. The procedure then advances to step S34 from S32.

If any of steps S30 to S33 advance to step S34, the player character attacks the enemy character according to the action command input by the user, and depending upon the success of the attack, the enemy character hit count HPB is decreased. The enemy character also attacks the player character as necessary according to the internally processed game content, and the player character hit count HPA is similarly decreased depending on the success of the attack.

When an attack between the characters ends, the procedure advances to step S35 to determine whether the battle is over. More specifically, the process variable HPX and the condition for determining the end of the battle (0) are compared. If (HPX>0) the battle is not over, the procedure loops back to step S21, and steps S21 to S35 repeat. Only if (HPX>0) is not true in step S35 is the battle determined to have ended and the procedure advances to step S36.

Figure 4:
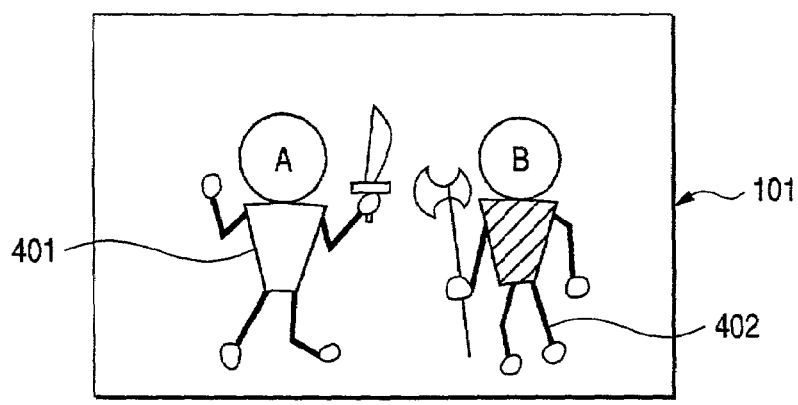
FIGS. 4A to 4D show examples of images displayed at different times in a battle in a first embodiment of the present invention.
Figure 4:
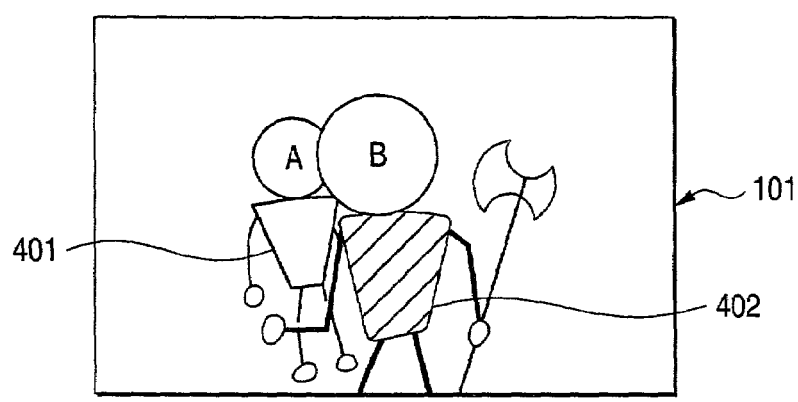
Figure 4:
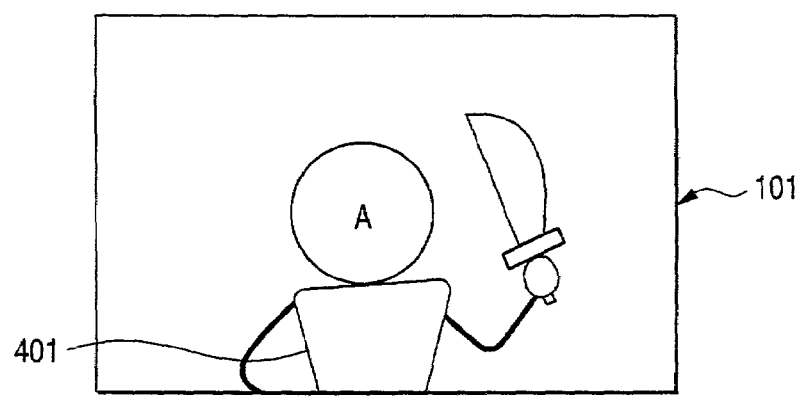
Figure 4:
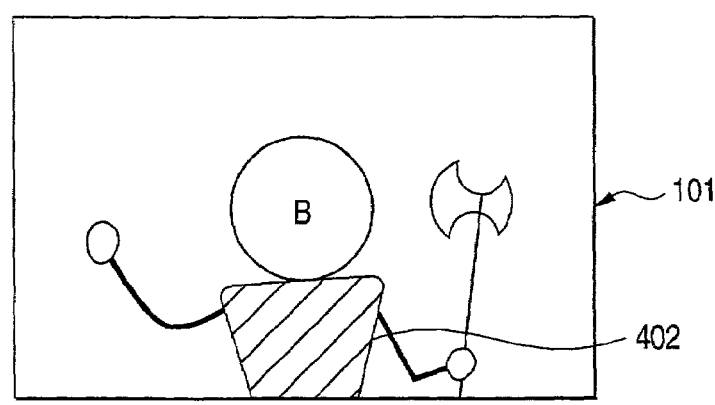

As a result of this process, an image from a perspective showing both characters is presented on the display at the beginning of a battle by supplying specific control data generated by the CPU 12 in step S30 to the graphics processor 16, so that the condition of both characters can be easily determined, as shown in FIG. 4A. As the battle progresses, an image from a perspective different from image X1 clearly showing both characters is presented as shown in FIG. 4B by supplying specific control data generated by the CPU 12 in step S31 to the graphics processor 16.

At the end of the game, specific control data generated by the CPU 12 in step S33 is supplied to the graphics processor 16 to display an image from a perspective different from that of both images X1 and X2. In addition, a close-up image from a perspective different from that of images X1, X2, and X3 enabling the condition of the losing character to be easily confirmed is displayed just before the end of the battle by supplying specific control data generated by the CPU 12 in step S32 to the graphics processor 16.

If in step S35 the game has not ended (HPX>0 is not true), the procedure advances to step S36 and it is determined if the image control parameter X is set to (X=B). If (X=B), the image control parameter X is set to (X=A), and the process variable HPX becomes (HPX=HPA). If (X=B) is not true in step S36, the image control parameter X is set to (X=B) at step S38, and the process variable HPX becomes (HPX=HPB).

When HPX is set, the procedure advances to step S39 and HPX is compared with a specific threshold value T3. If (HPX>T3), the procedure advances to step S41, where CPU 12 generates control data for displaying image X5 from a specific perspective, and the sequence of battle events ends.

If in step S39 (HPX>T3) is not true, the procedure advances to step S40, where HPX is compared with a specific threshold value T4 (where T3>T4>). If (HPX>T4), the procedure advances to step S42, where CPU 12 generates control data for displaying image X6 from a specific perspective, and the sequence of battle events ends.

If in step S40 (HPX>T4) is not true, the procedure advances to step S43, CPU 12 generates control data for displaying image X7 from a specific perspective (step S43), and the sequence of battle events ends.

As a result of this process, an image from a specific perspective is displayed immediately after the battle ends according to the hit count of the winner. For example, if (HPX>T3), CPU 12 generates control data for displaying image X5 from a specific perspective due to step S41, and this control data is passed to the graphics processor 16. If the player character is the winner, a close-up showing the condition of the player character 401, the winner, is displayed on screen as shown in FIG. 4C. However, if the enemy character is the winner, a close-up showing the condition of the enemy character 402, the winner, is displayed on screen as shown in FIG. 4D.

Figures 5, 6:
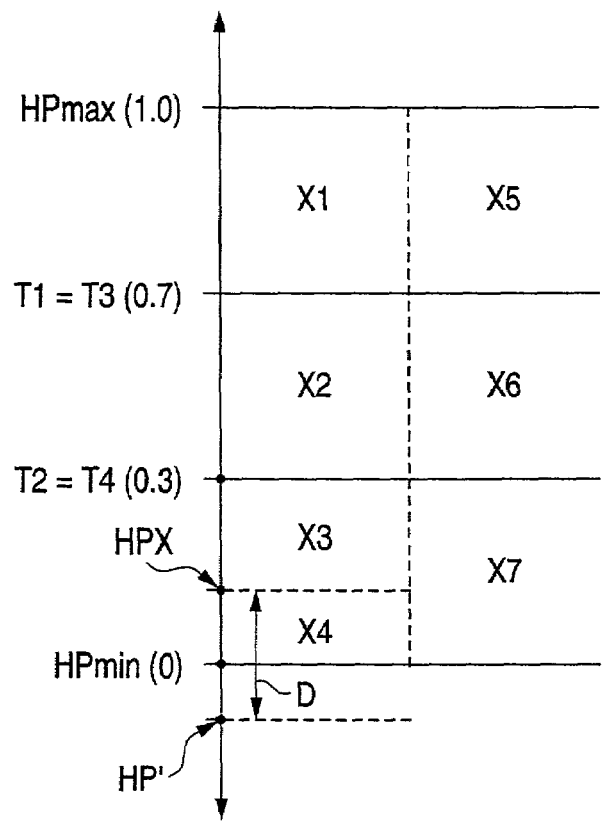
FIG. 5 is used to describe the operation of a video game machine according to a first embodiment of the invention.
FIG. 6 is used to describe the operation of a video game machine according to a first embodiment of the invention.

FIG. 5 shows an example of the relationship between hit counts and threshold values in this embodiment of the invention. FIG. 6 shows the concept of image data in this embodiment of the invention. Image control in the steps of the battle process shown in FIG. 3 is described next with reference to FIG. 5 and FIG. 6.

As shown in FIG. 5, the upper limit HPmax is 1.0 and the lower limit HPmin is 0 for both player character hit count HPA and enemy character hit count HPB. Threshold values T1 and T3 (T1=T3) are set to 0.7, and threshold values T2 and T4 (T2=T4) are set to 0.3. As shown in FIG. 6, player character 401 image data A1 to A7 for generating images from seven different perspectives, and enemy character 402 image data B1 to B7 for generating images from seven different perspectives, are stored in RAM 14.

If both player character hit count HPA and enemy character hit count HPB are 1.0 when the battle process starts, image control parameter X is set to (X=A), and the screen image is generated with image data A1 at the start of the battle. If the player character 401 gains superiority as the battle progresses so that (HPA>HPB), the display is generated using image data B1.

If the game advances with the player character 401 retaining superiority, the enemy character hit count HPB is decreased at the end of each attack between the players until the player character 401 wins. In this case the display is generated using image data B1 at the beginning of the battle as long as enemy character hit count HPB is (1.0>HPB>0.7), but when hit count HPB decreases to (0.7>=HPB>0.3) in mid battle, the display is updated using image data B2.

At the end of the battle when hit count HPB decreases to (0.3>=HPB>D) where D is a maximum decrease at the next attack, the display is updated again with image data B3. Just before the end of the battle when (D>=HPB>0), the display is updated again using image data B4. The battle is thus presented using images from four different perspectives. Immediately after the battle ends the display is updated again with an image from a perspective determined by the hit count HPA of the winner. For example, if (HPA>0.7), image data A5 is used to generate the display.

Although not shown in FIG. 3, an audio control step for determining whether to enable a specific dialogue is provided before or after a certain step from steps S30 to S33 and steps S41 to S43, so that in conjunction with the change of perspective one or more characters voices, a specific dialogue linked to information associated with each zone setting or other information. Images and dialogue thus progress together, thus improving game realism.

The preferred embodiment of the invention described above offers the following benefits.

First, loss of interest in the game can be prevented because the images continually change to a particular perspective according to character status, character type, and game progress.

Second, realism is improved because in addition to changing the display to present images from multiple different perspectives until the battle is decided, just before the battle is decided another specific image is displayed.

Third, it is possible to increase realism and prevent a loss of interest because the characters speak a specific dialogue appropriate to the game in conjunction with image changes.

An alternative embodiment of this invention is described below. While the preceding embodiment describes a game in which one player character and one enemy character battle, the present invention can also be applied to battles between three combatants (characters). In this case, images are prepared from different perspectives for each of the enemy (or ally) characters, hit counts are tallied or averaged by enemy character to determine a total hit count used to change to an image from a particular perspective.

Alternatively, images of different perspectives can be prepared for each of the ally characters, the hit counts of the enemy characters compared with each other and with a threshold values, and the result used to change the image to a particular perspective.

Further alternatively, the image perspective can be determined using only the enemy hit count.

It will also be noted that the above embodiment describes using a parameter determining the action capabilities of the characters, that is, the hit count, to determine the image perspective. However, if character action capabilities are determined using plural parameters, these parameters can be weighted as necessary and totalled or averaged to derive a single parameter used to determine the image perspective.

Although the present invention has been described in connection with the preferred embodiments thereof with reference to the accompanying drawings, it is to be noted that various changes and modifications will be apparent to those skilled in the art. For example, the order of the steps in the above described method of the invention can be changed without departing from the scope of the invention.

The same element in the accompanied drawings is denoted by the same reference number.

It will be known from the preceding description that this invention can flexibly change to an image from a specific perspective according to character status and game progress, and can thus prevent a loss of interest in the game.

What is claimed is:

1. A computer-readable data recording medium that stores a video game program for displaying a plurality of characters, including a player character and enemy character, on screen and controlling a battle between the characters, the program causing a computer to:
compare a parameter determining an action capability of a character participating in the baffle with a specific threshold value; and
change to an image from a specific point of view selected from among a plurality of points of view according to a result of the comparison.

2. A computer-readable data recording medium as described in claim 1, wherein N (where N is a natural number) mutually different numeric values other than a maximum value and a minimum value of the parameter determining an action capability are usable as the specific threshold value, one said numeric value being set to be close to a minimum parameter value, a point of view being changed in (N+1) stages.

3. A computer-readable data recording medium as described in claim 1, wherein the stored program additionally causes:
a comparison of a parameter determining an action capability of the player character and a parameter determining an action capability of the enemy character, wherein
an image is changed from the specific point of view selected from among the plurality of points of view according to a result of the parameter comparison.

4. A computer-readable data recording medium as described in claim 1, wherein the stored program additionally causes:
an inferring that the parameter determining action capability will be at least equal to a minimum value as a result of a next attack, wherein
an image is changed from the specific point of view selected from among a plurality of points of view according to a result of the parameter inferring.

5. A computer-readable data recording medium as described in claim 1, wherein the stored program additionally causes:
an evaluation game progress, wherein
an image is changed from the specific point of view selected from among the plurality of points of view according to a result of the evaluation.

6. A computer-readable data recording medium as described in claim 1, wherein the stored program additionally causes execution of: determining whether to enable a specific dialogue according to the result of the comparison.

7. A video game program for displaying a plurality of characters, including a player character and enemy character, on a screen, and controlling a battle between the player character and the enemy character, the program causing a computer to:
compare a parameter determining an action capability of a character, of the plurality of characters, participating in the battle with a specific threshold value; and
change to an image from a specific point of view selected from among a plurality of points of view according to a result of the comparison.

8. A video game program as described in claim 7, wherein N (where N is a natural number) mutually different numeric values other than a maximum value and a minimum value of the parameter determining an action capability are usable as the specific threshold value, one said numeric value being set to be close to a minimum parameter value, a point of view being changed in (N+1) stages.

9. A video game program as described in claim 7, further executing:
a comparison of a parameter that determines an action capability of the player character and a parameter determining an action capability of the enemy character, wherein
an image is changed from the specific point of view selected from among the plurality of points of view according to a result of the parameter comparison.

10. A video game program as described in claim 7, further executing:
an inferring that the parameter determining action capability will be at least equal to a minimum value as a result of a next attack, wherein
an image is changed from the specific point of view selected from among the plurality of points of view according to a result of the inference.

11. A video game program as described in claim 7, further executing:
evaluating a game progress, wherein
an image is changed from the specific point of view selected from among the plurality of points of view according to a result of the evaluation.

12. A video game program as described in claim 7, further executing:
determining whether to enable a specific dialogue according to the result of the parameter determining comparison.

13. A video game processing method for a video game for displaying a plurality of characters, including a player character and enemy character, on a screen, and controlling a battle between the characters, the video game processing method comprising:
comparing a parameter determining an action capability of a character, from among the plurality of characters, participating in the battle with a specific threshold value; and changing to an image from a specific point of view selected from among a plurality of points of view according to a result of the parameter determining comparison.

14. A video game processing method as described claim 13, wherein N (where N is a natural number) mutually different numeric values other than a maximum value and a minimum value of the parameter determining an action capability are usable as the specific threshold value, one said numeric value being set to be close to a minimum parameter value, a point of view being changed in (N+1) stages.

15. A video game processing method as described claim 13, further comprising:
   examining a parameter determining an action capability of the player character and a parameter determining an action capability of the enemy character, wherein
   an image is changed from the specific point of view selected from among the plurality of points of view according to a result of the examination.

16. A video game processing method as described in claim 13, further comprising:
   inferring that the parameter determining action capability will be at least equal to a minimum value as a result of a next attack, wherein
   an image is changed from the specific point of view selected from among the plurality of points of view according to a result of the inferring.

17. A video game processing method as described in claim 13, further comprising:
   evaluating a game progress, wherein
   an image is changed from the specific point of view selected from among the plurality of points of view according to a result of the evaluation.

18. A video game processing method as described in claim 13, further comprising:
   determining whether to enable a specific dialogue according to a result of the parameter determining comparison.

19. A video game processing apparatus, comprising:
   a storage device that stores a video game program for displaying a plurality of characters, including a player character and enemy character, on a screen, and controlling a battle between the characters;
   a computer that executes a program read from the storage device; and
   an image display device disposed as an output means of the computer, wherein
   the computer executes the program to compare a parameter determining an action capability of a character participating in the battle with a specific threshold value, and changes to an image from a specific point of view selected from among a plurality of points of view according to a result of the comparison.

20. A video game processing apparatus as described in claim 19, wherein N (where N is a natural number) mutually different numeric values other than a maximum value and a minimum value of the parameter determining an action capability are usable as the specific threshold value, one said numeric value being set to be close to a minimum parameter value, a point of view being changed in (N+1) stages.

21. A video game processing apparatus as described in claim 19, wherein the computer further judges a parameter determining an action capability of the player character and a parameter determining an action capability of the enemy character, and
   changes to an image from the specific point of view selected from among the plurality of points of view according to a result of the judgment.

22. A video game processing apparatus as described in claim 19, wherein the computer further infers that the parameter determining action capability will be at least equal to a minimum value as a result of a next attack, and
   changes to an image from the specific point of view selected from among the plurality of points of view according to a result of the inference.

23. A video game processing apparatus as described in claim 19, wherein the computer further evaluates a game progress, and
   changes to an image from the specific point of view selected from among the plurality of points of view according to a result of the evaluation.

24. A video game processing apparatus as described in claim 19, wherein the computer further determines whether to enable a specific dialogue according to a result of the parameter determining comparison.

* * * * *

UNITED STATES PATENT AND TRADEMARK OFFICE
CERTIFICATE OF CORRECTION

| | | |
|---|---|---|
| PATENT NO. | : 7,066,817 B2 | Page 1 of 1 |
| APPLICATION NO. | : 09/969773 | |
| DATED | : June 27, 2006 | |
| INVENTOR(S) | : Y. Sato | |

It is certified that error appears in the above-identified patent and that said Letters Patent is hereby corrected as shown below:

At column 13, line 36 (claim 1, line 7) of the printed patent, "baffle" should be --battle--.

Signed and Sealed this

Third Day of April, 2007

JON W. DUDAS
*Director of the United States Patent and Trademark Office*